Aug. 10, 1954     R. DAVENPORT     2,685,749
THREE-DIMENSION MAP
Filed May 29, 1953
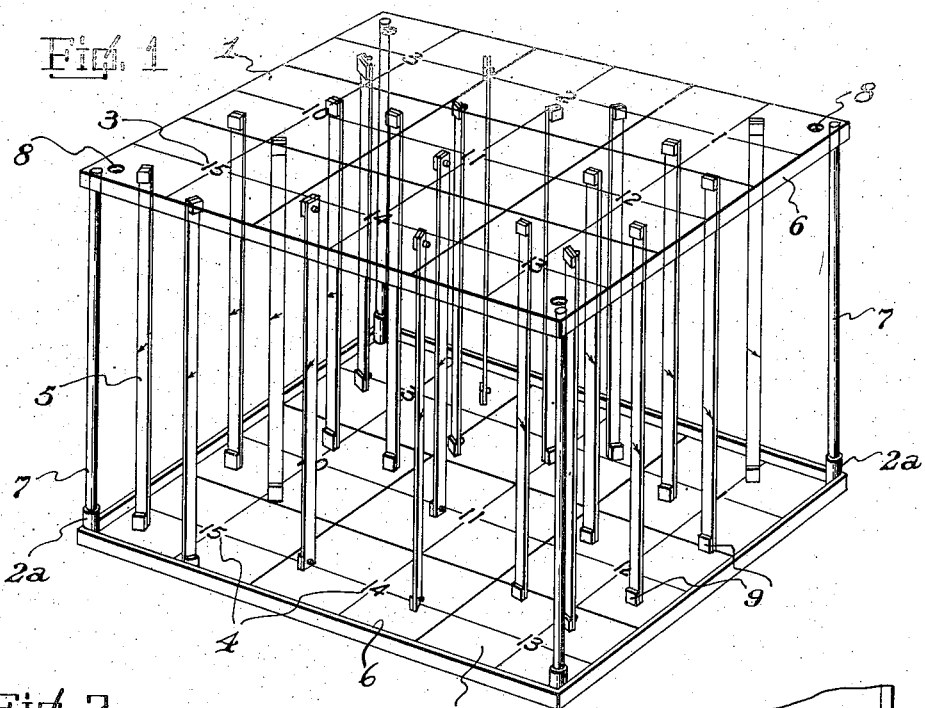
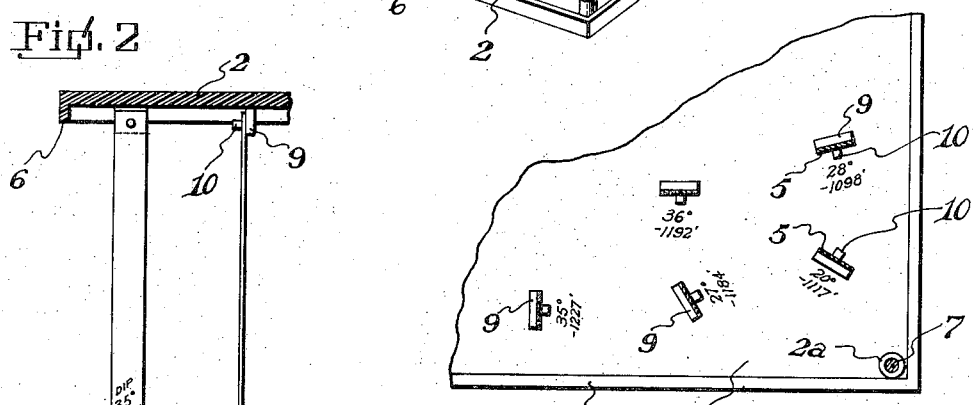
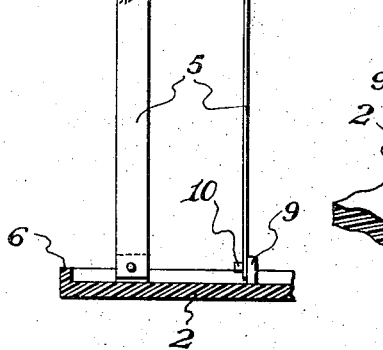
Robert Davenport
*INVENTOR.*

Patented Aug. 10, 1954

2,685,749

UNITED STATES PATENT OFFICE 2,685,749

THREE-DIMENSION MAP

Robert Davenport, Mission, Tex.

Application May 29, 1953, Serial No. 358,270

4 Claims. (Cl. 35—41)

1

The invention relates to three dimension maps, and has for its object to provide a device of this kind particularly adapted for use by geophysicist for visually displaying in a single device, in their proper relationship ground surface points and underground points in relation to each other and in relation to the surface points.

A further object is to provide a three dimensional map comprising an upper transparent plate connected to a lower transparent plate by data receiving transparent tapes. The data receiving tapes are connected to the plates at predetermined positions.

A further object is to provide means whereby the device is collapsible, and means whereby the device may be extended for use.

With the above and other objects in view the invention resides in the combination and arrangement of parts hereinafter claimed, such changes and modifications of the preferred embodiment being contemplated as would normally occur to those skilled in the art to which the invention relates.

In the drawing:

Figure 1 is a perspective view of the three dimensional map, showing the same extended.

Figure 2 is a vertical transverse sectional view through one side of the extended map.

Figure 3 is a horizontal sectional view through one corner of the map.

Figure 4 is a detail perspective view of the attaching means for the ends of the tapes.

Referring to the drawing the numerals 1 and 2 designate the upper and lower plates of the three dimensional map. Both of these plates are formed from transparent material, therefore it will be seen that the user can observe all interior parts of the device and particularly data such as shown at 3 and 4 on the plates 1 and 2, also data on the transparent flexible tapes 5. Data on tapes 5 are established in the usual way and when established are placed on the tapes, preferably with a waterproof ink. By forming the parts from a transparent material, it will be seen that all data can be observed at the same time and in its proper relationship. By making the map collapsible, it will be seen that it can be formed into a compact package for storage or shipment purposes.

Plates 1 and 2 are provided with marginal flanges 6 which lend rigidity to the plates. The corners of the lower plate 2 are provided with stretcher rod receiving sockets 2a, in which the lower ends of the stretcher rods 7 are received. Rods 7 have their upper ends in the flanged cor-

2 ners of the upper plate 1. In positioning or removing stretcher rods 7, they are first passed through the apertures 7 adjacent to the corners of upper plate 1.

The tapes may be connected to the respective plates in any convenient manner, but I prefer to employ lugs 9, secured adhesively to the plates, to which the tapes may be readily attached. Thus, each lug is provided with a lateral pin 10 adapted to be received in the end apertures 11 of each transparent tape. Pins 10 fit snugly in apertures 11 so the tapes will maintain their attachment to upper and lower plates when the device is collapsed. In assembling the device and data, the location and direction of the tape holding lugs 9 is first determined on a map, computed from the field data. The transparent bottom plate 2 is then laid on top of the map, and the lugs are then cemented to the plate in their proper positions and at the proper directional angles, which designates the directional dip of the structure. The same procedure is repeated on the top plate, except that the lugs are cemented to the underside of the upper plate. The maps are made on any scale desired, being on a larger scale when the data points would be too congested to be easily studied.

It will be seen that all the significant data on the seismic records of a prospect are collectively presented in a three dimensional map. Multiple structures are easily shown and all structural axes are revealed by observation from various positions. All interpretations may be viewed simultaneously. The geophysical data are drawn on strips of clear plastic in a cross section manner. The strips are assembled in their respective vertical positions and by means of lugs 9 and pins 10 are secured between two horizontal plates, which represent the datum plane and the plane in basement. Various colored inks, dyes and paints aid in making correlations outstanding. Geological data and well logs are easily added to the three dimensional map.

The invention having been set forth, what is claimed as new and useful is:

1. A three dimensional map, said map comprising an upper transparent plate, a lower transparent plate, means for maintaining said plates in spaced relation and a plurality of transparent data receiving tapes connecting said plates.

2. A device as set forth in claim 1, wherein said means comprises a plurality of spacer rods interposed between the plates and detachably connected thereto.

3. A device as set forth in claim 1, wherein the ends of the tapes are detachably connected to the inner sides of the plates and wherein said means comprises a plurality of spacer rods interposed between the plates and maintaining said plates spaced and said tapes taut.

4. A device as set forth in claim 1, wherein the plates are provided with marginal reinforcing flanges and wherein said means comprises a plurality of spacer rods interposed between the corners of said plates, sockets for said rods carried in the corners of one of said plates and rod receiving apertures carried by the corners of the other plate out of registry with said sockets.

References Cited in the file of this patent

UNITED STATES PATENTS

| Number | Name | Date |
|---|---|---|
| 298,812 | Anderson | May 20, 1884 |
| 727,140 | Hill et al. | May 5, 1903 |
| 1,683,952 | Cadman | Sept. 11, 1928 |
| 1,981,646 | Hamley | Nov. 20, 1934 |
| 2,556,798 | Concordet | June 12, 1951 |

FOREIGN PATENTS

| Number | Country | Date |
|---|---|---|
| 30,180 | Germany | Jan. 10, 1885 |
| 255,624 | Great Britain | July 29, 1926 |